United States Patent [19]
Adams et al.

[11] Patent Number: 5,990,871
[45] Date of Patent: *Nov. 23, 1999

[54] ERGONOMIC POINTING DEVICE

[75] Inventors: Aditha May Adams; Steven T. Kaneko, both of Seattle; Ferdinand van Engelen, Bellevue; Christopher Alviar, Seattle; Dick C. K. Liu, Bellevue; Dana Kim, Redmond; Bridget Cameron Greenberg, Bellevue, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/422,484

[22] Filed: Apr. 12, 1995

[51] Int. Cl.$^6$ ........................................ G09G 5/08
[52] U.S. Cl. ............................. 345/167; 345/157
[58] Field of Search .................... 345/167, 157, 345/156, 158, 159, 160, 163, 166; D14/110, 114; 74/471 XY; 463/37, 38, 46, 47

[56] References Cited

U.S. PATENT DOCUMENTS

| D. 272,921 | 3/1984 | Kim | D21/48 |
|---|---|---|---|
| D. 281,776 | 12/1985 | Griffin | D21/48 |
| D. 291,318 | 8/1987 | Kim | D14/114 |
| D. 292,600 | 11/1987 | Wagner | D21/48 |
| D. 299,140 | 12/1988 | Nakamura | D14/114 |
| D. 302,010 | 7/1989 | McLaughlin et al. | D14/114 |
| D. 315,552 | 3/1991 | Sacherman | D14/114 |
| D. 326,261 | 5/1992 | Ashmun et al. | D14/114 |
| D. 335,656 | 5/1993 | Garthwaite et al. | D14/114 |
| D. 347,628 | 6/1994 | Ashmun et al. | D14/114 |
| D. 350,344 | 9/1994 | Nakada | D14/114 |
| 3,395,589 | 8/1968 | Gersten | 74/471 |
| 3,625,083 | 12/1971 | Bose | 74/471 |
| 4,404,865 | 9/1983 | Kim | 74/471 |
| 4,533,830 | 8/1985 | Beauprey | 250/231 |
| 4,538,476 | 9/1985 | Luque | 74/471 |
| 4,562,347 | 12/1985 | Hovey et al. | 250/221 |
| 4,581,609 | 4/1986 | Hosogoe et al. | 340/710 |
| 4,786,892 | 11/1988 | Kubo et al. | 340/365 |
| 4,799,049 | 1/1989 | Avila | 340/709 |
| 4,801,931 | 1/1989 | Schmidt | 340/710 |

(List continued on next page.)

FOREIGN PATENT DOCUMENTS

| 0509337A2 | 10/1992 | European Pat. Off. | G06F 1/16 |
|---|---|---|---|
| 2154306 | 9/1995 | United Kingdom | G05G 9/04 |

OTHER PUBLICATIONS

Krohn, Nico, "Two Prohance Trackballs Offer Easy Thumb Control," *Infoworld*, Oct. 1, 1990.

Lusty, Susan and Lincoln Spector, "Keyboards, Mice, and Trackballs With the Personal Touch," *PC World*, Jum. 1990.

Webster, Bruce F., "The Macintosh Portable," *MAC-WORLD*, Nov. 1989.

"Formative studies in the development of a new computer pointing device for young children" Erik F. Strommen, Educational Technology/Apr. 1992.

*Primary Examiner*—Steven J. Saras
*Assistant Examiner*—Xu-Ming Wu
*Attorney, Agent, or Firm*—Seed and Berry LLP

[57] ABSTRACT

A pointing device that is ergonomically designed is shown and described. In a preferred embodiment designed for children aged 2–6, a relatively large ball is provided in a housing which has a gripping area or handle for each hand of a user, a portion of the ball extending from an upper surface of the housing. A button is provided in a front region of the housing, the placement, shape and size of the button being configured to optimize the target area and activation of the button by the user. The size of the ball and the configuration of the housing provide a pointing device that is easy and comfortable for a child aged 2–6 to use, the pointing device being designed to accommodate the hand size, motor control, and postural needs of young children.

17 Claims, 6 Drawing Sheets

U.S. PATENT DOCUMENTS

| | | | |
|---|---|---|---|
| 4,823,634 | 4/1989 | Culver | 74/471 |
| 4,913,387 | 4/1990 | Tice | 248/918 |
| 4,952,919 | 8/1990 | Nippoldt | 340/710 |
| 5,008,528 | 4/1991 | Duchon | 250/221 |
| 5,122,654 | 6/1992 | Koh et al. | 250/221 |
| 5,187,468 | 2/1993 | Garthwaite et al. | 340/709 |
| 5,252,970 | 10/1993 | Baronowsky | 345/154 |
| 5,268,675 | 12/1993 | Garthwaite et al. | 345/163 |
| 5,281,958 | 1/1994 | Ashmun et al. | 345/157 |
| 5,334,997 | 8/1994 | Scallon | 345/167 |
| 5,340,067 | 8/1994 | Martin et al. | 248/118.5 |

ERGONOMIC POINTING DEVICE

TECHNICAL FIELD

This invention relates to pointing devices for entering commands into a computer or other interactive system, and more particularly, to a trackball-type pointing device that is ergonomically designed, and in a preferred embodiment, is particularly well suited for children.

BACKGROUND OF THE INVENTION

Pointing devices for entering commands into a computer or other interactive system are well known in the art. Some pointing devices include a rotatable ball and one or more depressible keys, sometimes referred to as buttons. Electronic encoders sense rotation of the ball, and generate a signal indicative of the ball's rotation to control movement of a cursor on a screen of the computer. Depressing the keys permits a user to enter various commands into the computer, based on the location of the cursor and the software that is being used.

In a mouse-type pointing device, the rotatable ball extends from a bottom surface of the pointing device for contacting a work surface, such as a tabletop. The movement of the pointing device across a work surface causes rotation of the ball and the desired movement of the cursor on the screen.

In a trackball-type pointing device, the rotatable ball extends from a top surface of the pointing device and the ball is moved through contact with a user's hand. The movement of the trackball against the hand causes the desired movement of the cursor on the screen.

Many of the currently available pointing devices are designed for adults. As such, a child may have difficulty positioning the cursor and then depressing the keys; a child may not be able to control the movement of the pointing device with the level of precision typically required to accurately position the cursor; or a child may not be able to reach the desktop to move and use the pointing device. A need therefore exists for a pointing device that is easy for children to use.

SUMMARY OF THE INVENTION

In a preferred embodiment of the present invention, an ergonomically designed trackball-type pointing device is provided, having a substantially elliptical housing. The housing has a first gripping area for a left hand of a user and a second gripping area for a right hand of the user. The gripping areas are provided with texture, for example, raised ridges, to provide a tactile and visual cue for placement of the user's hand, and to enhance secure contact with the user's hand.

In a preferred embodiment for use by children, a relatively large ball is contained in the housing, a portion of the ball extending upward from an upper surface of the housing. The ball is sized to optimize manipulation of the ball by users having a hand size in the range of a 5th percentile 2 year old North American child to a 95th percentile 6 year old North American child. The ease with which the ball may be rotated by a user is set to provide sufficient resistance to accommodate the motor skills of a child aged 2–6. A button is located in a front region of the housing for entering commands into a computer, the location, size and shape of the button being configured to optimize both the target area and activation of the button.

In a preferred embodiment of the present invention, the housing slopes in an upward direction from a front region of the housing to a rear region of the housing, to orient the product to the user. A bottom surface of the housing has feet to stabilize the pointing device and thereby allow a user to comfortably and accurately use the pointing device on a work surface or in the lap of the user.

The housing is further designed to ensure that the ball is captured and retained by the housing. As a result, users, particularly children, cannot easily remove the ball, thereby helping to ensure that the ball does not get lost or damaged, and that users do not place their hands or other objects in the pointing device. The housing is also configured to minimize the amount of dust and debris that may enter the housing via the clearance opening between the ball and housing. To further protect the printed circuit board (PCB) contained in the housing, a protective cover is provided that encases the PCB to form an encoder chassis assembly. The protective cover also shields the PCB from being handled when, for example, the pointing device housing is opened to clean the inner workings and surfaces of the pointing device.

All of the design features noted above work together in a preferred embodiment to provide physical and visual cues for a child user to orient, grasp, and use the pointing device in a manner that is suitable to a child's hand size, degree of fine motor coordination, and postural needs.

DETAILED DESCRIPTION OF THE INVENTION

Figure 1:
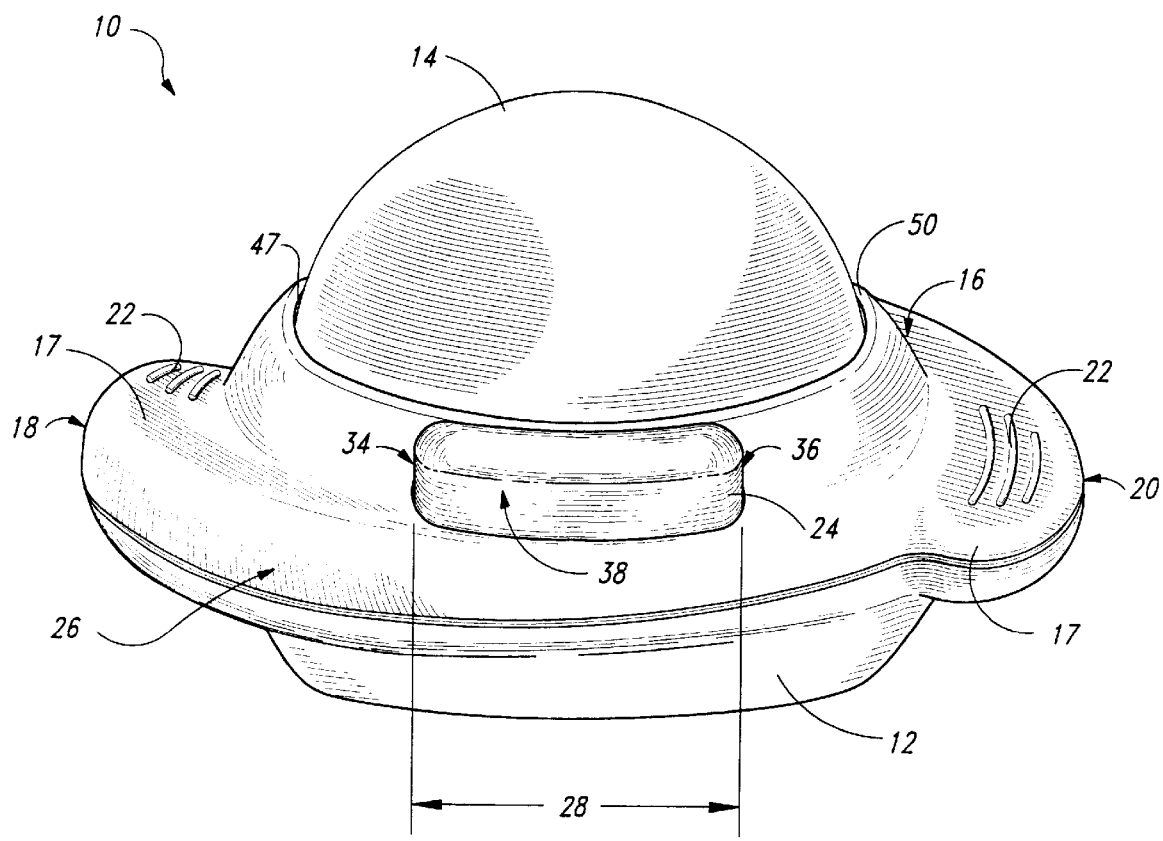
FIG. 1 is a front isometric view of a pointing device provided in accordance with a preferred embodiment of the present invention.
Figure 3:
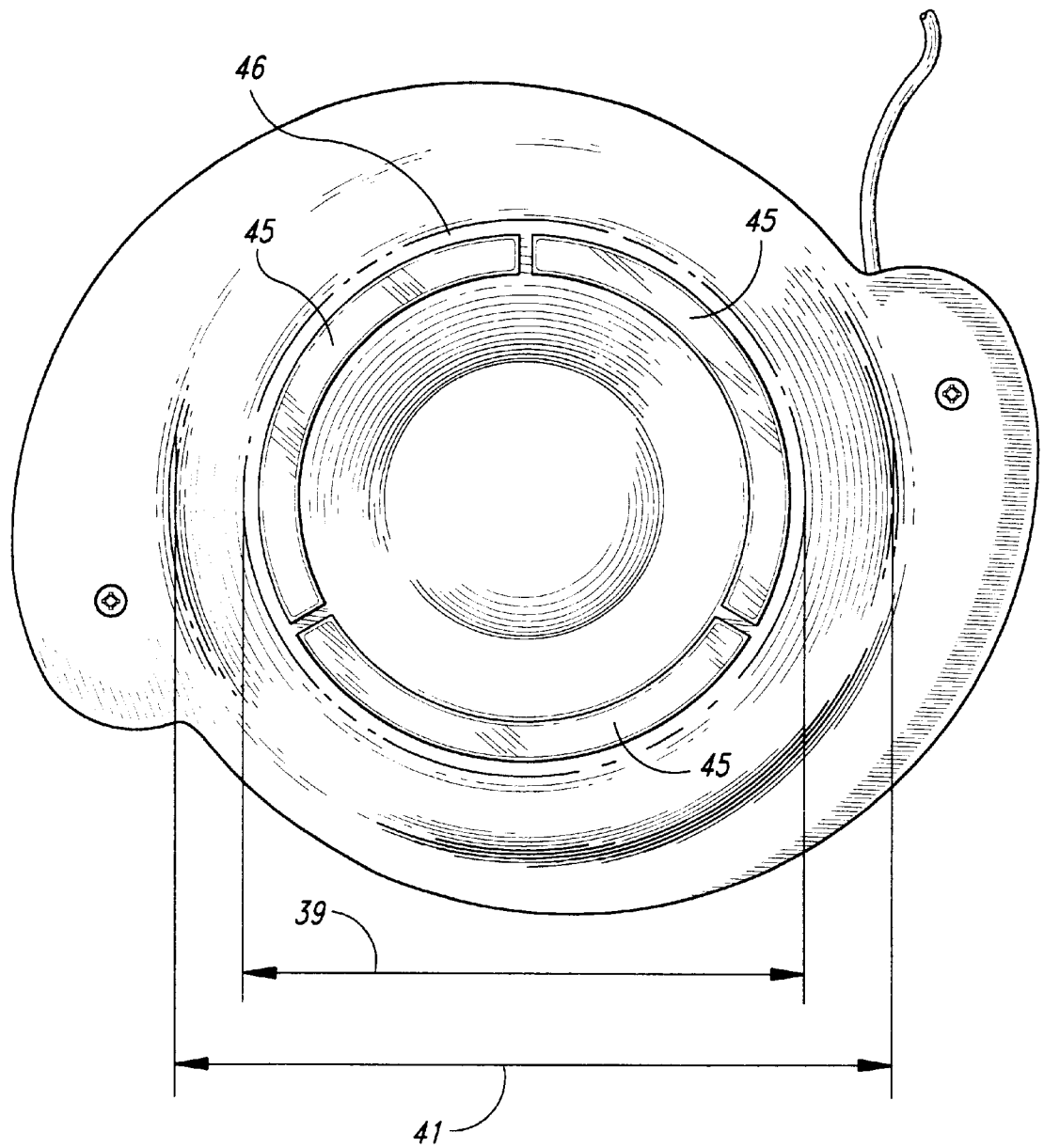
FIG. 3 is a bottom plan view of the pointing device of FIG. 1.
Figure 7:
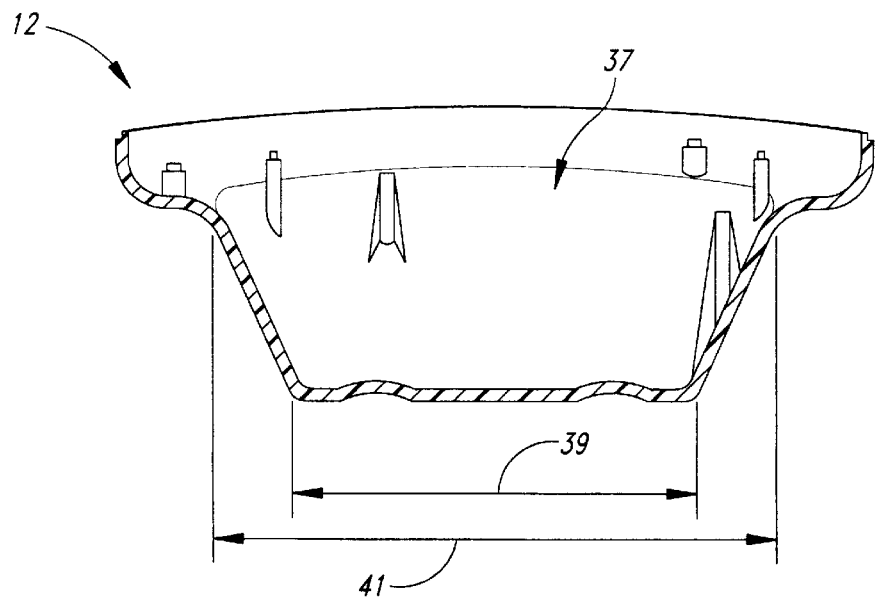
FIG. 7 is a cross-sectional front elevational view of the pointing device of FIG. 1.

As illustrated in FIG. 1, a trackball-type pointing device 10 provided in accordance with a preferred embodiment of the present invention is ergonomically designed, and in a preferred embodiment, is particularly well suited for young children, aged 2–6. The housing 12 is substantially elliptical, the size and rounded edges of the housing 12 making it suitable for a user to position and use the pointing device 10 in his or her lap. In a preferred embodiment, as illustrated in FIGS. 3 and 7, a diameter 39 of a bottom surface 46 is 3.75–6.25 inches, which corresponds to the range of inter-thigh crest dimensions expected for a 5th percentile 2-year old. Similarly, diameter 41 of pointing device 10 is 3.75–6.25 inches, the particular dimensions of the bottom region of pointing device 10 being selected according to the targeted age group. In a preferred embodiment, diameter 39 is approximately 4 inches and diameter 41 is approximately 5 inches such that the pointing device is sized to be securely and comfortably held on the lap of a seated child aged 2–6. It will also be understood that the pointing device may be positioned on a work surface, such as a table or desktop. In order to ensure that the pointing device 10 is stable regardless of whether it is placed on a work surface or on a user's lap, a plurality of non-skid feet 45 are provided on the bottom surface 46 of housing 12, as illustrated in FIG. 3. The housing 12 is also symmetrical to allow the pointing device 10 to be grasped and used by either or both hands of a user.

The housing 12 has a first gripping area or handle 18 for a left hand of a user, and a second gripping area or handle 20 for a right hand of the user. A top surface 17 of each of gripping areas 18 and 20 is provided with texture, for example, raised ridges 22, to provide a tactile and visual cue for the placement of the user's hands, and to enhance secure contact between the pointing device 10 and the user's hands.

Figure 2:
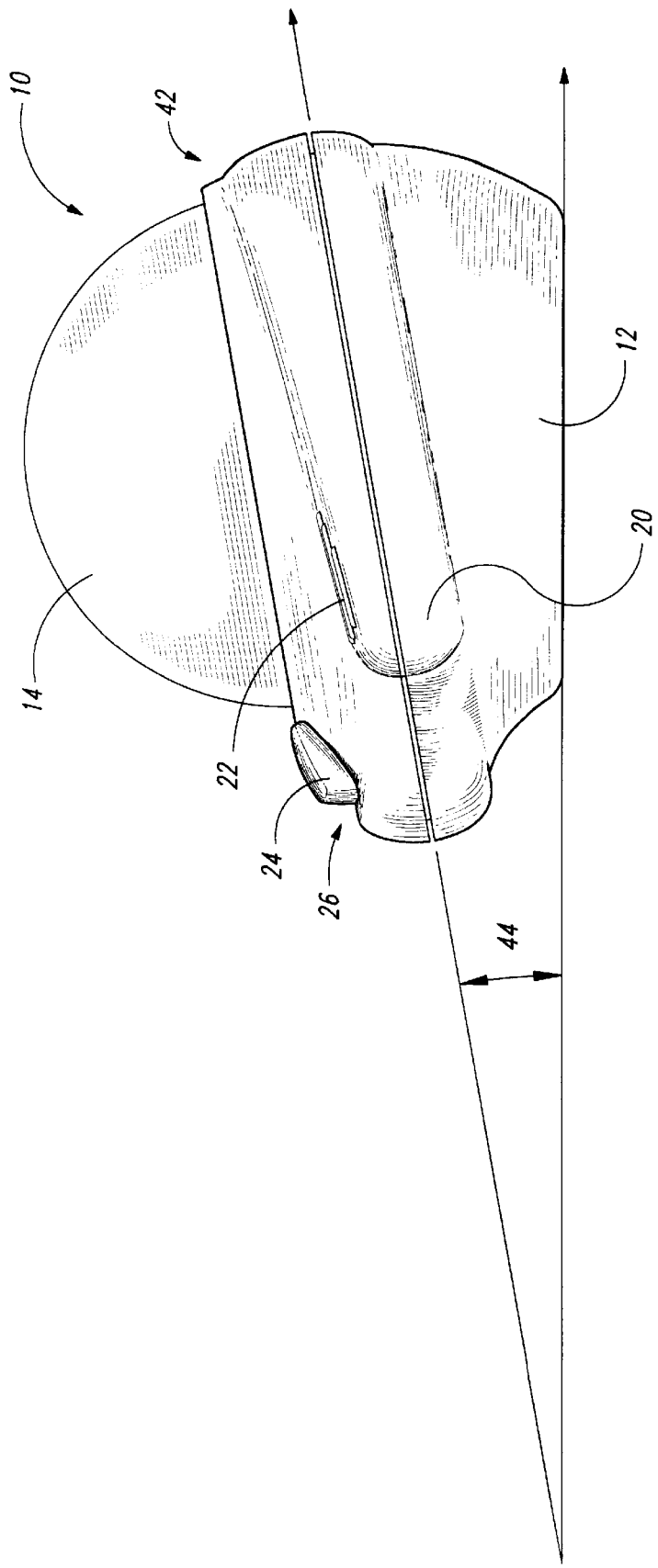
FIG. 2 is a right side elevational view of the pointing device of FIG. 1.
Figure 5:
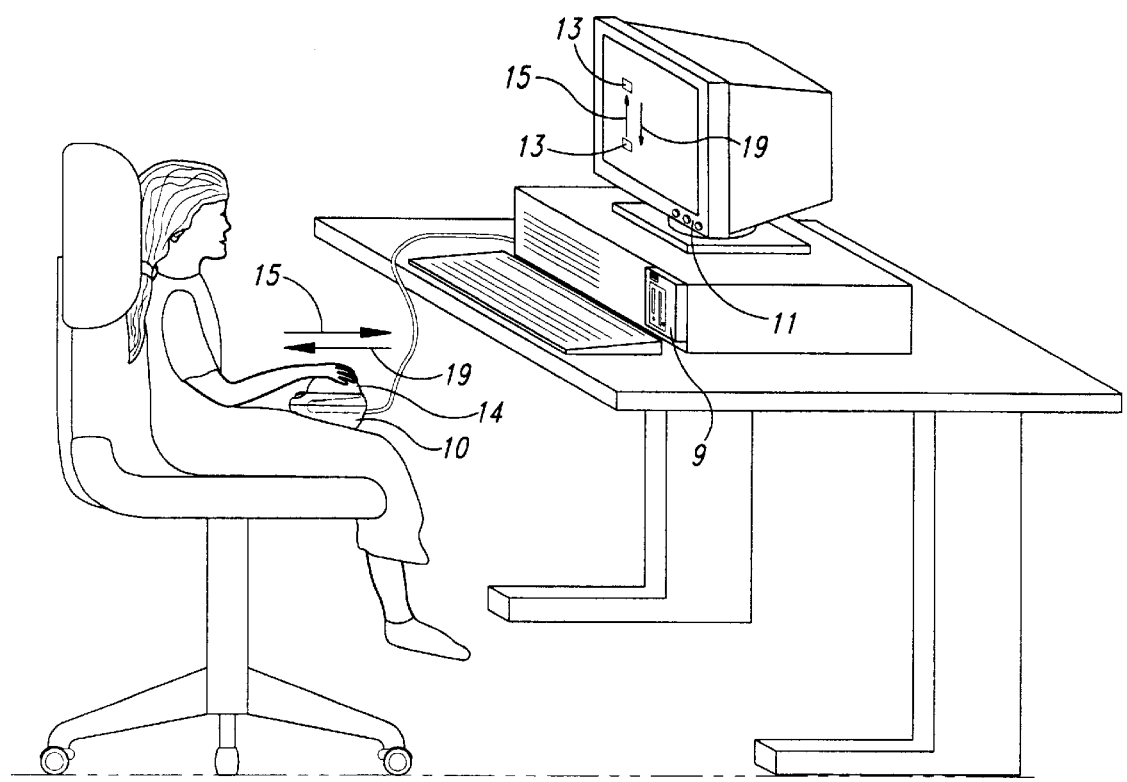
FIG. 5 is an illustration of the pointing device of FIG. 1 in use.

As illustrated in FIG. 2, the housing 12 slopes in upward direction from a front region 26 of the housing to a rear region 42, the positive slope being preferred to orient the product to the user. Orientation is believed to be important to ensure that the directional movement of the ball corresponds to the expected movement of the cursor 13 on a screen 11, such as of a computer 9. For example, as illustrated in FIG. 5, rolling the ball 14 "upwards" as illustrated by reference arrow 15 should produce a corresponding movement of the cursor 13 upwards on the screen 11. Similarly, rolling the ball 14 "downwards" as illustrated by reference arrow 19 should cause the cursor 13 to move downward on the screen 11. It is therefore important to provide a visual cue to the user to orient the device with the front region 26 of the housing closest to the user. In a preferred embodiment, the slope 44 of housing 12 is in the range of 5°–15°, to ensure that the slope is clearly discernible to a child aged 2–6 yet not require a movement beyond the comfortable range of motion for the child's hand when moving the hand from the front region 26 to the rear region 42 of pointing device 10. It is believed that optimal results are achieved when the slope 44 is 9°–11°.

In a preferred embodiment, as illustrated in FIGS. 1 and 2, a relatively large ball 14 is provided in housing 12, a portion of the ball 14 extending upward from an upper surface 16 of housing 12. The ball 14 is sized to optimize manipulation of the ball by users having a hand length falling within an anthropometrically defined range, from a 5th percentile North American 2 year old to a 95th percentile North American 6 year old. The range is based on hand size, a larger percentage being assigned to a larger hand, and vice versa. This means that the ergonomic pointing device described herein is believed to accommodate a group of users ranging from a 2 year old child in the fifth percentile, having a relatively small hand, to a 6 year old child in the ninety-fifth percentile, having a relative large hand. It will be appreciated that users falling outside of this design range may still enjoy advantages from the preferred embodiment and that alternative preferred embodiments can be developed for other target user groups, for example, 7–10 year olds, in accordance with the present invention.

Given a range of hand lengths from 3.66 to 5.43 inches, and a belief that optimal control is achieved through hand contact with at least ⅓ but no more than ½ of the surface area of the ball, the diameter of the ball is 3.38–6.7 inches. It is believed that optimal results are achieved when a diameter of the ball is 3.75–4.5 inches, and in particular 4 inches. The ball may be controlled by a left hand or right hand or even both hands of a user. The ball 14 thereby accommodates the motor skills of children aged 2–6, given that the relatively large contact area allows the user to control the ball with larger movements that use more muscles and are therefore relatively easy to make when compared to the ease with which children aged 2–6 may make fine, precise, and smaller movements.

In support of this conclusion, applicants conducted observational tests wherein they presented six pointing devices having balls of varying diameter to nine children, and observed each subject's interaction with the ball. In conducting their review, applicants looked for desirable palm ridge and palm heel contact with the ball, and undesirable fingertip contact with the housing. Based on these criteria and the relative proportion of the ball to the hand of the user, applicants assigned a rating and corresponding numerical value. By adding the weighted ratings for each ball and user, an overall rating was obtained for each ball tested. In some instances, however, the child was distracted or some other occurrence prevented the observer from being able to rate that child's use of a particular ball. The number of these occurrences for each ball are summarized in a table below under the column heading N/A.

As can be seen from the summary of test results summarized below in Table 1, ball 1 having a diameter of 3.0 inches was too small for all of the users that the observers were able to review and assign a rating. Similarly, ball 2 having a diameter of 5.0 inches and ball 3 having a diameter of 4.75 inches, were both too big. Ball 5, having a diameter of 4 inches, provided the best results.

TABLE 1

| | | Frequency Count | | | | | |
|---|---|---|---|---|---|---|---|
| Ball # | Ball Size (inches) | Too Small (−1) | Too Big (−1) | OK (.5) | Good (+1) | N/A | Overall Rating |
| 1 | 3.0 | 8 | — | — | — | 1 | too small |
| 2 | 5.0 | — | 6 | — | — | 3 | too big |
| 3 | 4.75 | — | 4 | 2 | 1 | 1 | −2 = too big |
| 4 | 4.5 | — | 1 | 7 | — | 1 | 2.5 = ok |
| 5 | 4 | — | — | 4 | 3 | 2 | 5 = good |
| 6 | 3.5 | 2 | — | 3 | 1 | 3 | .5 = ok |

Figure 4:
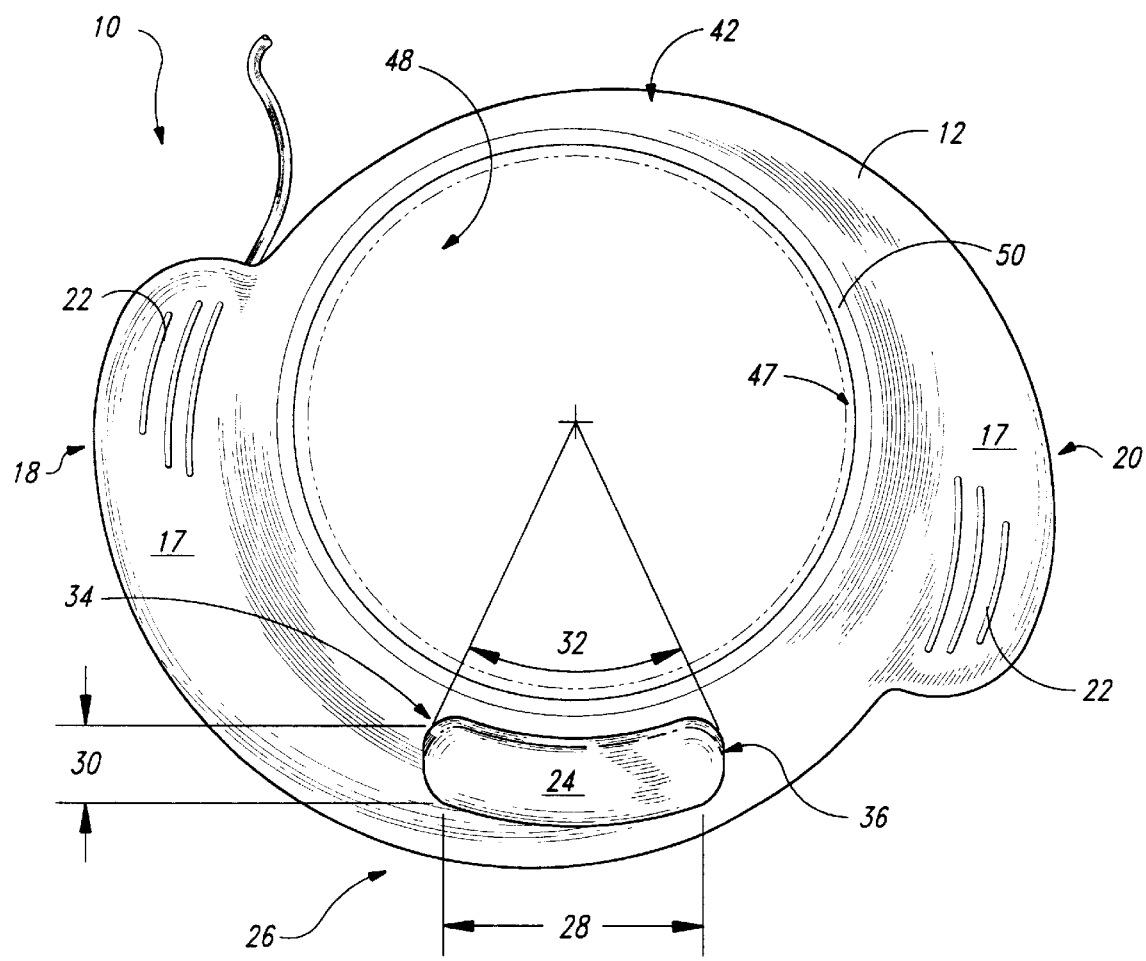
FIG. 4 is a top plan view of the pointing device of FIG. 1.

To ensure that ball 14 is retained by housing 12, the housing is configured to capture over ½ of the surface area of the ball. This prevents users, particularly children, from easily removing the ball, and from placing their hands or other objects into the pointing device. In order to prevent a user's nails or fingers from being caught or pinched in gap 47 between ball 14 and housing 12, the tolerance or gap 47 between the two is 0.5 mm±0.3 mm as illustrated in FIGS. 1 and 4, and a lip 50 is provided around opening 48 in which ball 14 sits. This close tolerance further minimizes the amount of dust and debris that may enter housing 12 via gap 47, thereby improving the length of time the pointing device may be accurately operated without needing to open the housing and clean an inner region of the pointing device. In a preferred embodiment, lip 50 is polished to further ensure that dust or other debris slides away from gap 47.

Figure 6:
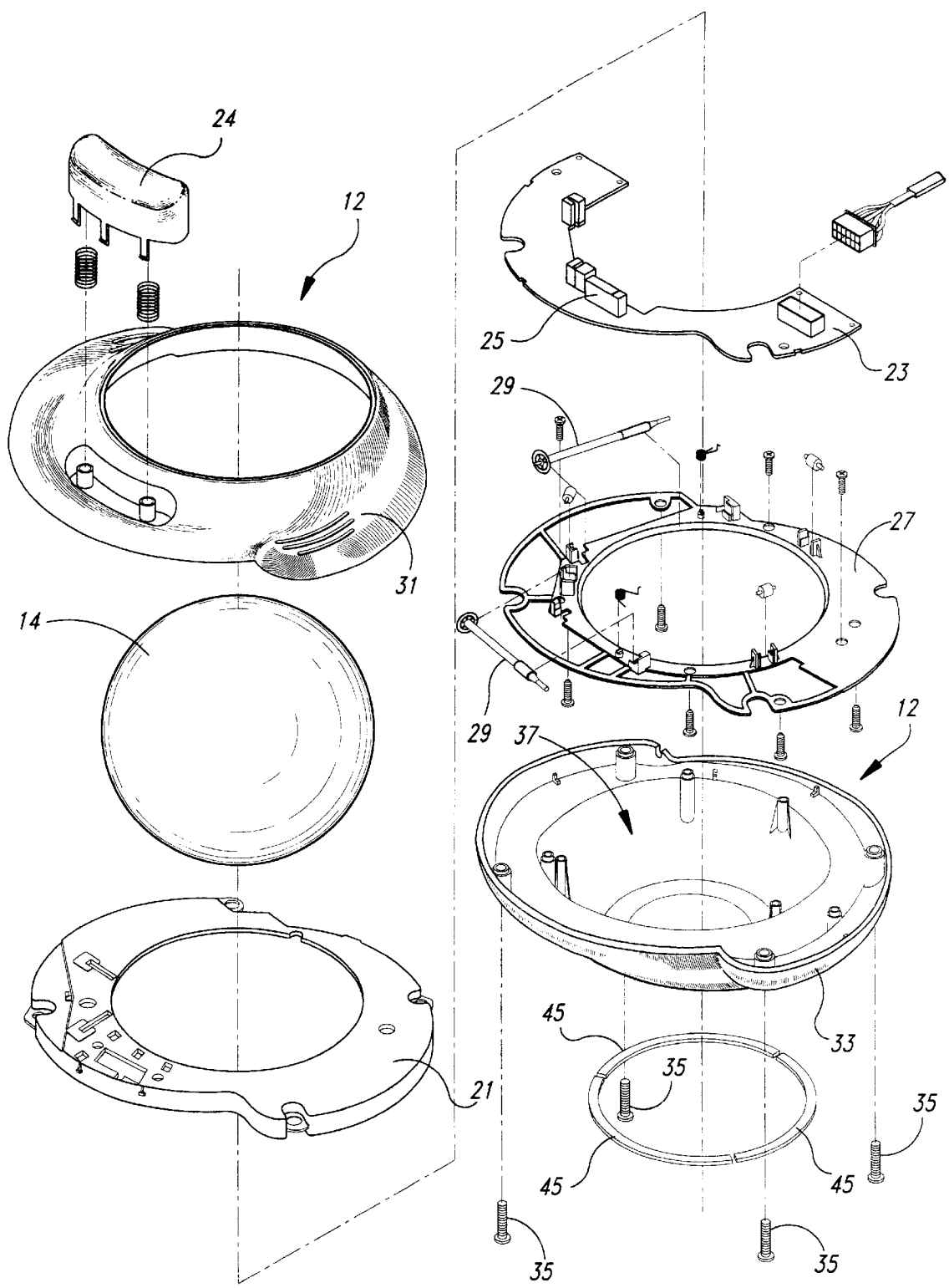
FIG. 6 is an exploded isometric view of the pointing device of FIG. 1.

As illustrated in FIG. 6, a printed circuit board (PCB) 23 contained in housing 12 is protected by being encased by a cover having a top bracket 21 and a bottom bracket 27 that screw together to form an encoder chassis assembly. Therefore, when it is desired to clean encoder wheels 29 and an inner bottom region 37 of housing 12, four screws 35 are removed and a top half 31 of housing 12 is removed from a bottom half 33 of housing 12. Ball 14 may also then be removed, exposing inner region 37. Encoder wheels 29 are also accessible for cleaning through a gap between bracket 21 and bracket 27; however, printed circuit board 23 is encased in brackets 21 and 27. This has several advantages in that a user is not faced with the printed circuit board when opening the pointing device, and the encoder chassis assembly comprising brackets 21 and 27 and printed circuit board 23 may be put together as a subassembly and then screwed into the bottom half 33 of housing 12, thereby simplifying production. It is also believed that by encapsulating the printed circuit board 23 in accordance with a preferred embodiment of the present invention, the sound of the motion of ball 14 is lessened.

In a preferred embodiment, the ease with which the ball may be rotated by a user is set to provide sufficient resistance to accommodate the motor skills of children aged 2–6, thereby ensuring that a child user will have adequate control over the movement of the ball to accurately position the cursor.

In a preferred embodiment, a button 24 is provided in a front region 26 of housing 12, the button location, size, and shape being configured to optimize a target area and activation of the button 24. In particular, placement of the button in a front region 26 of housing 12 is preferred given that in typical postures during use, both on the lap of a user and on a work surface, movement of the hand from the ball 14 to the button 24 requires a movement of the forearm more within the neutral range of movement, as opposed to a movement from the ball 14 to a rear region 42 of the housing, which requires an extension of the forearm. Also, the placement of the button 24 in the front region of the pointing device is in keeping with stereotypical behavior and expectancies for children aged 2–6. The front location of the button 24 is also equally accessible to both left- and right-handed use of the pointing device 10.

The button 24 is shaped in an elongated oval, curving concentrically with the ball 14. Button 24 has a length 28 of 1.75–2.5 inches, a width 30 of 0.5–0.75 inch, and comprises approximately 40°–60° of arc 32. This button size and shape optimizes the target area and activation of the button 24, given that the elongated oval accommodates activation within a range of angles expected when either the left or right hand, index finger or thumb, is moved from the top of the ball 14 to the front region 26 of the device, without interfering with the gripping areas 18 and 20 to either side of the button. If the arc 32 of the button is too large, the button 24 will interfere with gripping areas 18 and 20, and if arc 22 is too small, the button presents a target that requires more precise alignment of hand movement than is optimal for children aged 2–6.

As illustrated in FIGS. 1 and 2, a first end 34 and second end 36 of button 24 are fully radiused for comfortable, safe contact, and to present a larger and less directional activation area to the user. A front edge 38 of button 24 is raised to ensure that the button will activate a switch 25 in the pointing device, no matter where on its surface the button is depressed.

In using a preferred embodiment of the present invention, therefore, a user grasps the pointing device 10 via gripping areas 18 and 20, and positions the pointing device with the front region 26 nearest to the user. The pointing device 10 may be placed on a work surface or on the user's lap. A user places a hand on the ball 14, and rotates the ball to cause a desired corresponding movement of the cursor 13 on the monitor 11. When the cursor is positioned as desired on the monitor, the user strikes the button 24 with a thumb or finger of the user's hand, thereby entering a command into the computer 9.

A pointing device that is ergonomically designed has been shown and described. From the foregoing, it will be appreciated that, although embodiments of the invention have been described herein for purposes of illustration, various modifications may be made without deviating from the spirit and scope of the invention. For example, although all features of the preferred embodiment described herein are believed to contribute to the improved ergonomic results of the present invention, modification or omission of an individual feature or features may be made and still gain benefits of the present invention. Thus, the present invention is not limited to the embodiments described herein, but rather is defined by the claims which follow.

We claim:

1. A pointing device comprising: a housing;
   a ball provided in the housing, a portion of the ball extending upward from an upper surface of the housing; and
   a button located in a front region of the upper surface of the housing, the button having the shape of an elongated oval that curves concentrically with the ball, and sized to provide a target that is easily struck by the user from a variety of angles, while ensuring that the button will activate the switch when pushed wherein the button is 1.75–2.5 inches long, 0.5–0.75 inch wide, and has an arc of 40°–60°.

2. The pointing device according to claim 1 wherein the button has a first end, a second end, and a front edge, the first and the second ends being rounded and the front end being raised.

3. The pointing device according to claim 1 wherein the housing slopes in an upward direction from a front region of the housing to a rear region of the housing.

4. The pointing device according to claim 1 wherein the ease with which the ball may be rotated by a user is set to provide sufficient resistance to accommodate the motor skills of a North American child aged 2–6 having a hand size that is in the range of a fifth percentile 2 year old to a ninety-fifth percentile 6 year old, thereby allowing the child to have adequate control over the movement of the ball.

5. A pointing device comprising:
   a housing having upper and lower housing portions, the lower housing portion having a flat bottom surface and rounded side portions, the flat bottom surface being sized to correspond to interthigh crest dimensions for a 5th percentile 2-year old child;
   a ball provided in the housing, a portion of the ball extending upward from an upper surface of the upper housing portion; and
   a button located in a front region of the upper housing portion, the button activating a switch where it is pushed by a user.

6. The pointing device according to claim 5 wherein a diameter of the ball is 3.38–6.7 inches.

7. The pointing device according to claim 5, further including first and second lip members extending from the housing at a spaced apart distance from the bottom surface of the housing, the first lip member forming a first gripping area for the left hand of a user and the second lip member forming a second gripping area for the right hand of the user.

8. The pointing device according to claim 7 wherein a portion of each of the gripping areas is provided with texture to indicate where the user's hand should be placed and to enhance secure contact with the user's hand.

9. The pointing device according to claim 5 wherein a bottom surface of the housing is provided with a plurality of non-skid feet to enhance the stability of the housing when placed on a work surface or on a lap of the user.

10. The pointing device according to claim 5 wherein the ease with which the ball may be rotated by a user is set to provide sufficient resistance to accommodate the motor skills of a North American child aged 2–6 having a hand size that is in the range of a fifth percentile 2 year old to a ninety-fifth percentile 6 year old, thereby allowing the child to have adequate control over the movement of the ball.

11. The pointing device according to claim 5 wherein more than half of the ball is provided in an opening in the housing, the opening being surrounded by a lip such that the ball may not be removed from the opening while the housing is intact.

12. The pointing device according to claim 5 wherein more than half of the ball is provided in an opening in the housing, the opening being surrounded by a lip.

13. The pointing device according to claim 5 wherein the button is in the shape of an elongated oval that curves concentrically with the ball, and the button is sized to provide a target that is easily struck by the user from a variety of angles, while ensuring that the button will activate the switch when pushed.

14. The pointing device according to claim 5 wherein the button is 1.75–2.5 inches long, 0.5–0.75 inch wide, and has an arc of 40°–60°.

15. The pointing device according to claim 5 wherein the button has a first end, a second end, and a front edge, the first and the second ends being rounded and the front end being raised.

16. The pointing device according to claim 5 wherein the housing slopes in an upward direction from a front region of the housing to a rear region of the housing.

17. The pointing device according to claim 16 wherein the slope of the housing is 5°–15°.

* * * * *